United States Patent
Sawada

(10) Patent No.: US 11,641,015 B2
(45) Date of Patent: May 2, 2023

(54) METHOD FOR PRODUCING POSITIVE ELECTRODE MATERIAL FOR NONAQUEOUS SECONDARY BATTERY

(71) Applicant: NICHIA CORPORATION, Anan (JP)

(72) Inventor: Shunsuke Sawada, Anan (JP)

(73) Assignee: NICHIA CORPORATION, Anan (JP)

( * ) Notice: Subject to any disclaimer, the term of this patent is extended or adjusted under 35 U.S.C. 154(b) by 282 days.

(21) Appl. No.: 16/229,246

(22) Filed: Dec. 21, 2018

(65) Prior Publication Data

US 2019/0198874 A1    Jun. 27, 2019

(30) Foreign Application Priority Data

Dec. 25, 2017   (JP) .............................. JP2017-247809

(51) Int. Cl.
| | | |
|---|---|---|
| *H01M 4/525* | (2010.01) | |
| *H01M 4/505* | (2010.01) | |
| *C01G 53/00* | (2006.01) | |
| *H01M 4/02* | (2006.01) | |

(52) U.S. Cl.
CPC ............ *H01M 4/525* (2013.01); *C01G 53/50* (2013.01); *C01G 53/66* (2013.01); *H01M 4/505* (2013.01); *C01P 2002/52* (2013.01); *C01P 2002/77* (2013.01); *C01P 2006/40* (2013.01); *H01M 2004/028* (2013.01)

(58) Field of Classification Search
CPC ..... C01G 53/50; C01G 53/66; C01P 2002/52; H01M 4/485; H01M 4/505; H01M 4/525
See application file for complete search history.

(56) References Cited

U.S. PATENT DOCUMENTS

| | | | | |
|---|---|---|---|---|
| 2003/0047717 A1* | 3/2003 | Kim | .................. | H01M 10/0525 252/500 |
| 2005/0175897 A1* | 8/2005 | Jung | .................... | H01M 4/505 429/223 |
| 2013/0052544 A1* | 2/2013 | Ohkubo | .............. | H01M 4/5825 429/344 |
| 2015/0228974 A1* | 8/2015 | Kokado | ................. | B82Y 30/00 429/223 |
| 2016/0028074 A1* | 1/2016 | Sugiura | ............... | H01M 4/1315 429/223 |
| 2016/0351973 A1* | 12/2016 | Albano | .................... | H01M 4/13 |
| 2019/0181454 A1* | 6/2019 | Horikawa | ............. | H01M 4/628 |
| 2020/0411857 A1* | 12/2020 | Sawada | ............... | H01M 4/0404 |

FOREIGN PATENT DOCUMENTS

| | | | |
|---|---|---|---|
| JP | 2012138197 A | * | 7/2012 |
| JP | 2013-182757 A | | 9/2013 |

OTHER PUBLICATIONS

Kadosaki, Machine translation of JP-2012138197-A, Japan (Year: 2012).*

* cited by examiner

*Primary Examiner* — Brian R Ohara
*Assistant Examiner* — Brent C Thomas
(74) *Attorney, Agent, or Firm* — Hunton Andrews Kurth LLP

(57) ABSTRACT

A method for producing a positive electrode material for a nonaqueous secondary battery includes the steps of mixing a compound containing lithium, a compound containing nickel and $BaTiO_3$ to form a mixed material; and sintering the mixed material to form a lithium transition metal composite oxide.

9 Claims, No Drawings

METHOD FOR PRODUCING POSITIVE ELECTRODE MATERIAL FOR NONAQUEOUS SECONDARY BATTERY

CROSS-REFERENCE TO RELATED APPLICATION

This application claims priority to Japanese Patent Application No. 2017-247809, filed on Dec. 25, 2017, the disclosure of which is hereby incorporated by reference in its entirety.

BACKGROUND

The present disclosure relates to a method for producing a positive electrode material for a nonaqueous secondary battery.

A lithium transition metal composite oxide usable as a positive electrode active material for a nonaqueous secondary battery has a high redox potential of about 4 V, and provides a large battery capacity when being used to produce a secondary battery. Therefore, the lithium transition metal composite oxide is in a wide use for a secondary battery of an electronic device such as a mobile phone, a notebook computer, a digital camera or the like. Recently, it has been actively studied to use the lithium transition metal composite oxide for a large-scale secondary battery for an electric vehicle (EV), a hybrid electric vehicle (HEY), a power source for electric power storage or the like.

As electronic devices have higher level of functions, a secondary battery is now desired to have a larger capacity. An example of lithium transition metal composite oxide that has been developed is, as described in, for example, Japanese patent publication No. 2013-182757, a lithium-nickel-cobalt-manganese composite oxide obtainable as a result of a part of Ni in a lithium-nickel oxide being replaced with Co and Mn. The lithium-nickel-cobalt-manganese composite oxide has a content of cobalt lower than that of the lithium-cobalt oxide and thus has an advantage of realizing a secondary battery at lower cost.

However, the lithium-nickel-cobalt-manganese composite oxide has the following problem. In the case where, for example, a battery containing the lithium-nickel-cobalt-manganese composite oxide receives a strong external impact and thus causes rapid heat generation in the positive electrode, the lithium-nickel-cobalt-manganese composite oxide in a charged state reduces nickel or the like by the heat generation and generates gas as a result of desorption of oxygen. In order to avoid this, the composite oxide itself is required to be more stable. For example, Japanese Patent Publication No. 2013-182757 discloses that use of a lithium-cobalt composite oxide containing Sr atoms and Ti atoms improves the thermal stability of the positive electrode.

SUMMARY

One non-limiting and exemplary embodiment provides a method for producing a positive electrode material for a nonaqueous secondary battery which suppresses generation of gas while being stored at a high temperature.

In one general aspect, a method for producing a positive electrode material for a nonaqueous secondary battery, including the steps of mixing a compound containing lithium, a compound containing nickel and $BaTiO_3$ to form a mixed material; and sintering the mixed material to form a lithium transition metal composite oxide.

According to the above aspect, it is possible to provide a method for producing a positive electrode material for a nonaqueous secondary battery which does not generate much gas while being stored at a high temperature.

DETAILED DESCRIPTION

The present inventor made detailed studies on the thermal stability of a lithium transition metal composite oxide, especially, a method for suppressing generation of gas from the lithium transition metal composite oxide while the lithium transition metal composite oxide is stored at a high temperature. As a result, the present inventor has found that the generation of oxygen while the lithium transition metal composite oxide is stored at a high temperature may be suppressed by incorporating barium titanate when sintering the lithium transition metal composite oxide. Hereinafter, a method for producing a lithium transition metal composite oxide in an embodiment according to the present disclosure will be described in detail. The embodiments and examples described below are merely examples, and the method for producing the lithium transition metal composite oxide according to the present disclosure is not limited to any of the following embodiments or examples. In this specification, the term "step" refers to an independent step and also a step that is not clearly distinguishable from another step but achieves a predetermined purpose thereof. Regarding the term "content" of each of components in a composition, in the case where the composition contains a plurality of substances corresponding to a particular component, the "content" refers to a total content of such a plurality of substances in the composition, unless otherwise specified. The term "average particle diameter" of particles of a material or the like refers to a central particle diameter of particles corresponding to 50% of the volume cumulative diameter from the small diameter-side in the particle diameter distribution obtained by a laser scattering method.

1. Positive Electrode Material for a Nonaqueous Secondary Battery

A positive electrode material for a nonaqueous secondary battery in this embodiment contains a lithium transition metal composite oxide containing titanium or a titanium compound derived from $BaTiO_3$ (barium titanate). The lithium transition metal composite oxide is a main component of the positive electrode material for a nonaqueous secondary battery, and acts as a positive electrode active material. In the case where $BaTiO_3$ is incorporated into a mixed material for the lithium transition metal composite oxide and the resultant substance is sintered, a part of $BaTiO_3$ is thermally decomposed at a temperature at which a lithium compound in the mixed material is melted. When the lithium compound is diffused into a nickel-containing compound to synthesize the lithium transition metal composite oxide, the titanium compound generated by the thermal decomposition is also incorporated into the synthesized oxide. Therefore, titanium is solid-dissolved at a surface of the particles or in the vicinity thereof and also at a center of the particles. In general, the lithium transition metal composite oxide is stabilized in the structure by titanium being solid-dissolved. In the positive electrode material for a non-aqueous secondary battery in this embodiment, titanium may be solid-dissolved in the entirety of the particles. Therefore, reduction of nickel is more suppressed than in the case where titanium is solid-dissolved at the surface of the particles or in the vicinity thereof. It is considered that for this reason, generation of gas is suppressed. Among BaTiO$_3$ not thermally decomposed, a barium compound generated by the thermal decomposition of BaTiO$_3$ and the titanium compound generated by the thermal decomposition of BaTiO$_3$, the substance that is not solid-dissolved in the particles of the lithium transition metal composite oxide is considered to be present at the boundary or the surface of the lithium transition metal composite oxide, and thus to contribute to the structural stability of the surface and the boundary of the lithium transition metal composite oxide. Hereinafter, these components will be described in detail.

(Lithium Transition Metal Composite Oxide)

The lithium transition metal composite oxide contains lithium and at least nickel as a transition metal, and has a layer structure. As described above, the titanium compound derived from BaTiO$_3$ (barium titanate) is considered to be oxidized at a high temperature specifically because the lithium transition metal composite oxide contains nickel, and to act on the lithium transition metal composite oxide, which is easily decomposable, in a preferred manner and thus to suppress the generation of gas.

The lithium transition metal composite oxide may have a composition represented by the following composition formula (1).

$$Li_aNi_xCo_yM1_zTi_vM2_wO_2 \quad (1)$$

In the composition formula (1), a, x, y, z, v and w fulfill the following conditions.

$0.95 \leq a \leq 1.5$ $0 < x \leq 1$ $0 \leq y \leq 1$ $0 \leq z \leq 0.35$ $0.0001 \leq v \leq 0.02$ $0 \leq w \leq 0.05$ $x+y+z+v+w \leq 1$ M1 is at least one element selected from the group consisting of Al, Mn and Mg. M2 is at least one element selected from the group consisting of Zr, W, Ta, Nb and Mo.

There is a tendency that the lithium transition metal composite oxide has improved output characteristics when having a high content of lithium. However, there is also a tendency that it is difficult to synthesize a lithium transition metal composite oxide having a high content of lithium. In consideration of these points, the value of "a" in the composition formula (1) of the lithium transition metal composite oxide is set to the range of $0.95 \leq a \leq 1.5$. The range of the value of "a" is preferably $0.98 \leq a \leq 1.25$, and more preferably $1 \leq a \leq 1.15$.

The lithium transition metal composite oxide contains at least nickel as the transition metal. From the point of view of charge/discharge capacity, the value of x in the composition formula (1) of the lithium transition metal composite oxide may be set to the range of $0 < x \leq 1$, and the value of y in the composition formula (1) of the lithium transition metal composite oxide may be set to the range of $0 \leq y \leq 1$. As the composition ratio of nickel in the transition metal is higher, generation of gas occurs more easily by the reduction of nickel, and thus the effect of this embodiment is expressed more easily. Therefore, the ranges of the values of x and y are preferably $0.3 \leq x \leq 0.95$ and $0.05 \leq y \leq 0.45$, and more preferably $0.45 \leq x \leq 0.90$ and $0.1 \leq y \leq 0.4$.

The lithium transition metal composite oxide may contain the element M1, which is at least one element selected from the group consisting of aluminum, manganese and magnesium. From the points of view of the charge/discharge capacity and the structural stability of the lithium transition metal composite oxide, the value of z in the composition formula (1) of the lithium transition metal composite oxide is set to the range of $0 \leq z \leq 0.35$. The range of the value of z is preferably $0.01 \leq z \leq 0.25$, and more preferably $0.05 \leq z \leq 0.15$.

The lithium transition metal composite oxide contains at least titanium derived from BaTiO$_3$, and may contain titanium derived from another titanium compound. From the points of view of the stability of crystalline structure and the charge/discharge capacity, the value of v in the composition formula (1) of the lithium transition metal composite oxide is set to the range of $0.0001 \leq v \leq 0.02$. The range of the value of v is preferably $0.0002 \leq v \leq 0.0175$, and more preferably $0.0003 \leq v \leq 0.015$.

The lithium transition metal composite oxide may further contain the element M2, which is at least one element selected from the group consisting of zirconium, tungsten, tantalum, niobium and molybdenum. The content of the element M2 may be appropriately determined in consideration of the characteristics required of the nonaqueous secondary battery. It should be noted that it is preferred that the content of the element M2 is not very high because the element M2 decreases the capacity of the nonaqueous secondary battery. In consideration of these points, the value of w in the composition formula (1) of the lithium transition metal composite oxide is set to the range of $0 \leq w \leq 0.05$. The range of the value of w is preferably $0 \leq w \leq 0.02$ in consideration of the balance of various characteristics.

(Other Additives)

The positive electrode material for a non-aqueous secondary battery may contain any other material generally usable for a positive electrode material in addition to the lithium transition metal composite oxide, and the titanium compound and the barium compound derived from BaTiO$_3$. Specifically, the positive electrode material for a non-aqueous secondary battery may contain a conductive additive, a binder, a solvent or the like.

2. Method for Producing the Lithium Transition Metal Composite Oxide

A method for producing the lithium transition metal composite oxide in an embodiment will be described. Herein, the method for producing the lithium transition metal composite oxide includes the step of mixing a compound containing lithium, a compound containing nickel and BaTiO$_3$ to form a mixed material, and the step of sintering the mixed material to produce the lithium transition metal composite oxide.

(Step of Forming the Mixed Material)

First, a compound containing lithium, a compound containing nickel and BaTiO$_3$ are mixed to form a mixed material. The "compound containing nickel" refers to a compound containing at least nickel among the transition metal materials that may be contained in composition formula (1). The nickel-containing compound may further contain at least one element selected from cobalt, the element M1 and the element M2.

The material forming the lithium transition metal composite oxide may be an oxide, a hydroxide, a nitrate, a sulfate, a carbonate or the like of each of the elements. Examples of the lithium source include lithium carbonate, lithium nitrate, lithium hydroxide, and the like. Examples of the nickel source include nickel carbonate, nickel sulfate, nickel hydroxide, nickel oxide, nickel peroxide, and the like. Examples of the cobalt source include cobalt oxide, cobalt trioxide, cobalt tetraoxide, cobalt hydroxide, cobalt nitrate, cobalt sulfate, and the like. Examples of the aluminum source include aluminum oxide, aluminum hydroxide, aluminum nitrate, aluminum sulfate, and the like. Examples of the magnesium source include magnesium oxide, magnesium hydroxide, magnesium nitrate, magnesium sulfate, and the like. Examples of the manganese source include manganese dioxide, manganese trioxide, manganese tetraoxide, manganese carbonate, manganese nitrate, manganese sulfate, and the like. Examples of the tungsten source include tungsten oxide, lithium tungstate, ammonium tungstate, an organic compound of tungsten, and the like. Examples of the niobium source include niobium oxide, lithium niobite, an organic compound of niobium, and the like. Examples of the zirconium source include zirconium fluoride, zirconium chloride, zirconium bromide, zirconium iodide, zirconium oxide, zirconium sulfide, zirconium carbonate, and the like. Examples of the titanium source include titanium oxide. Examples of the molybdenum source include molybdenum oxide.

For example, as the nickel-containing compound, an oxide containing nickel, cobalt and the element M1 may be prepared by a precipitation method. Such an oxide is specifically prepared as follows. First, an aqueous solution containing nickel ion, cobalt ion and ion of the element M1, prepared from a nickel compound, a cobalt compound and a compound of the element M1 as described above and having predetermined composition ratios represented by the composition formula (1), is dropped toward pure water that is being stirred. Then, the temperature of the aqueous solution is kept at 40 to 80° C. While the aqueous solution is being stirred, an aqueous solution of sodium hydroxide is dropped such that the resultant aqueous solution has a pH value of 8 to 12. As a result, a precipitate of nickel-cobalt-M1 is obtained. Instead of the aqueous solution of sodium hydroxide, an alkaline solution such as an aqueous solution of ammonium hydrogen carbonate, an aqueous solution of sodium hydrogen carbonate, an aqueous solution of potassium hydroxide, an aqueous solution of lithium hydroxide or the like may be used.

Next, the precipitate of nickel-cobalt-M1 is separated by filtration, and the precipitate is rinsed with water. The resultant substance is thermally treated while being stirred in an oxygen-containing gas flow of 80° C. to 400° C. As a result, a nickel-cobalt-M1 composite oxide is formed. The nickel-cobalt-M1 composite oxide has an average particle diameter of preferably, for example, 2 to 20 μm, more preferably 3 to 10 μm, and still more preferably 4 to 8 μm. The nickel-cobalt-M1 composite oxide has a specific surface area of preferably 10 $m^2/g$ or larger, more preferably 50 $m^2/g$ or larger, and still more preferably 80 $m^2/g$ or larger. As a result, the nickel-containing compound is prepared.

Cobalt, a compound containing the element M1 and a compound containing the element M2 may be prepared as being contained in the nickel-containing compound as described above, or may be prepared separately from the nickel-containing compound. In the latter case, a material containing cobalt, the element M1 or the element M2 is prepared such that such a substance has a composition ratio represented by the composition formula (1) with respect to the nickel-containing compound. As the compound containing lithium, any of the lithium sources described above is usable as it is.

As $BaTiO_3$, commercially available $BaTiO_3$ may be used as it is, or $BaTiO_3$ may be synthesized by use of a barium source and a titanium source. An example of the barium source may be barium carbonate, and an example of the titanium source may be titanium oxide. $BaTiO_3$ has an average particle diameter of preferably 0.01 to 20 μm, more preferably 0.05 to 10 and still more preferably 0.1 to 5 μm.

It is preferred that $BaTiO_3$ is contained at a content of 0.1 mol % or higher with respect to the nickel-containing compound. The content of $BaTiO_3$ is more preferably 0.1 mol % or higher and 2 mol % or lower, still more preferably 0.3 mol % or higher and 1.75 mol % or lower, and further preferably 0.5 mol % or higher and 1.5 mol % or lower. In the case where the content of $BaTiO_3$ is lower than 0.1 mol %, the effect of suppressing the generation of gas is not sufficient. By contrast, in the case where the content of $BaTiO_3$ is higher than 2 mol %, the discharge/discharge capacity is decreased.

(Step of Forming the Lithium Transition Metal Composite Oxide)

The mixed material is sintered to form the lithium transition metal composite oxide. The sintering may be performed in the air or in an oxygen atmosphere.

The sintering temperature is preferably 650° C. or higher and 1100° C. or lower, and more preferably 700° C. or higher and 900° C. or lower. In the case where the sintering temperature is too low, a part of the material that is left unreacted remains in a positive electrode active material. This decreases the discharge capacity per unit mass, declines the cycle characteristics and decreases the operating voltage. In the case where the sintering temperature is too high, a by-product is easily generated. This decreases the discharge capacity per unit mass, declines the cycle characteristics and decreases the operating voltage. The sintering time may be 5 hours or longer and 30 hours or shorter. As long as the sintering time is 5 hours or longer, the diffusion reaction between the particles of the mixed material proceeds sufficiently. As long as the sintering time is 30 hours or shorter, a high productivity is realized.

After the sintering, the resultant substance may be optionally pulverized by a grinding mortar, a ball mill, a vibration mill, a pin mill, a jet mill or the like to form powder having an intended particle diameter. The resultant positive electrode material has an average particle diameter of preferably 2 to 20 μm, more preferably 3 to 10 μm, and still more preferably 4 to 8 μm. The resultant positive electrode active material has a specific surface area of preferably 0.2 to 1.5 $m^2/g$ and more preferably 0.3 to 0.8 $m^2/g$.

As described in the following examples, it is preferred to incorporate $BaTiO_3$ to the lithium transition metal composite oxide at the time of sintering thereof. In this case, titanium or a titanium compound generated by the thermal decomposition of $BaTiO_3$ is solid-dissolved in the particles of the lithium transition metal composite oxide, which provides an effect of sufficiently suppressing the generation of gas. If $BaTiO_3$ is incorporated after the lithium transition metal composite oxide is formed and the resultant substance is thermally treated, the effect of suppressing the generation of gas is small. If $SrTiO_3$ or $TiO_2$ is used instead of $BaTiO_3$, the effect of suppressing the generation of gas is small.

3. Positive Electrode

A positive electrode includes a positive electrode current collector and a positive electrode active material layer supported by the positive electrode current collector. The positive electrode active material layer contains a lithium transition metal composite oxide, a conductor, and a binder.

The positive electrode current collector may be formed of, for example, aluminum in a plate-like or foil-like form. The positive electrode active material layer is generally formed as follows. The positive electrode active material, the binder and the conductor are dispersed in a liquid medium to form a slurry, and the slurry is applied to, and dried on, the positive electrode current collector. The positive electrode active material layer obtained as a result of the application and drying may be further pressurized by a roll-press or the like in order to increase the filling density of the positive electrode active material.

There is no specific limitation on the material of the binder usable to form the positive electrode active material layer. Examples of the usable material include poly(vinylidenedifluoride), polytetrafluoroethylene, polyamideacrylic resin, and the like.

The positive electrode active material layer usually contains a conductor in order to increase the conductivity thereof. There is no specific limitation on the material of the conductor. Examples of the usable material include graphite such as natural graphite, artificial graphite and the like; carbon materials such as acetylene black, carbon black and the like; etc. One of these materials may be used independently, or two or more of these materials may be used in combination.

4. Nonaqueous Secondary Battery

The nonaqueous secondary battery includes a positive electrode formed by use of the above-described lithium transition metal composite oxide, a negative electrode capable of occluding or releasing lithium, and a nonaqueous electrolyte containing a lithium salt as an electrolyte. The nonaqueous secondary battery further includes a separator, retaining the nonaqueous electrolyte, provided between the positive electrode and the negative electrode.

The negative electrode usually includes a negative electrode current collector and a negative electrode active material layer provided on the negative electrode current collector, like the positive electrode. Examples of negative electrode active material include metallic lithium, a lithium alloy such as a lithium-aluminum alloy or the like, and a carbon material capable of occluding and releasing lithium. Usually, the negative electrode active material may be a carbon material capable of occluding and releasing lithium because such a carbon material provides a high level of safety. For example, graphite such as natural graphite or artificial graphite is usable. Instead of such a carbon material, a compound capable of occluding and releasing lithium may be used as the negative electrode active material. For example, a metal oxide such as tin oxide, titanium oxide or the like is usable.

There is no specific limitation on the material of the electrolyte. Any compound that is not modified or decomposed by the operating voltage is usable. The electrolyte encompasses an electrolytic solution. Examples of solvent for the electrolytic solution include organic solvents such as dimethoxy ethane, diethoxy ethane, ethylene carbonate, propylene carbonate, dimethyl carbonate, diethyl carbonate, methyl ethyl carbonate, methyl formate, γ-butyrolactone, 2-methyltetrahydrofuran, dimethyl sulfoxide, sulfolane, and the like. One of these materials may be used independently, or two or more of these materials may be used in combination.

Examples of lithium salt for the electrolytic solution include lithium perchlorate, lithium tetrafluoroborate, lithium hexafluorophosphate, lithium trifluoromethanesulfonate, and the like. The solvent and the lithium salt described above are mixed to form an electrolytic solution. A gelling agent or the like may be incorporated so that the electrolytic solution is used in a gel state. Alternatively, the electrolytic solution may be used as being absorbed into a liquid-absorbing polymer. The lithium salt is usually contained in the electrolytic solution at a content of 0.5 mol/L or higher and 1.5 mol/L or lower.

A conductive solid electrolyte formed of an inorganic or organic lithium ion is also usable. The separator may be formed of a porous film of polyethylene, polypropylene or the like.

The nonaqueous secondary battery is produced by assembling the positive electrode, the negative electrode, the electrolyte and optionally, the separator described above into an appropriate shape. Optionally, another component such as an external housing or the like may be used.

5. EXAMPLES

Lithium transition metal composite oxides and nonaqueous secondary batteries were produced under various conditions, and the amounts of generated gas were measured. Hereinafter, the results will be described.

(1) Production of the Positive Electrode

Example 1

An aqueous solution containing cobalt ion, nickel ion and manganese ion, prepared from nickel sulfate, cobalt sulfate and manganese sulfate, was put into a reaction tank. The amounts of nickel sulfate, cobalt sulfate and manganese sulfate were adjusted such that molar ratio of cobalt, nickel and manganese (cobalt:nickel:manganese) in the aqueous solution would be 55:20:25. The temperature of the aqueous solution was made 50° C., and an aqueous solution of sodium hydroxide was dropped such that the resultant aqueous solution would have a pH value of 9 to 12. As a result, a precipitate containing cobalt, nickel and manganese was obtained. The precipitate was separated by filtration and rinsed with water. The precipitate rinsed with water was thermally treated at 300° C. in an oxygen-containing gas flow. As a result a nickel-cobalt-manganese composite oxide $((Ni_{0.2}Co_{0.55}Mn_{0.25})_3O_4)$ was obtained. The composite oxide had an average particle diameter of 6.4 μm and a specific surface area of 56 m²/g. The average particle diameter was measured by a laser diffraction-type particle distribution meter, and the specific surface area was measured by a BET specific surface area meter.

$BaTiO_3$ and lithium carbonate $(Li_2Co_3)$ were incorporated into the resultant composite oxide. The amount of lithium carbonate was adjusted such that the molar ratio of lithium carbonate, as converted into the molar ratio of lithium, with respect to the total molar amount of nickel, cobalt and manganese would be 1.07. The amount of $BaTiO_3$ was adjusted to be 0.1 mol % with respect to the composite oxide. The composite oxide, $BaTiO_3$ and lithium carbonate were mixed, and thus a mixed material was obtained.

The mixed material was sintered at 880° C. for 15 hours in the air. After the sintering, the resultant substance was pulverized and sieved. As a result, a positive electrode material was obtained. Hereinafter, the pre-sintering incorporation of $BaTiO_3$ as in this example will be referred to as "primary incorporation".

Example 2

The same step was performed as in example 1 to obtain a positive electrode material except that the amount of $BaTiO_3$ was adjusted to be 0.3 mol % with respect to the composite oxide.

Example 3

The same step was performed as in example 1 to obtain a positive electrode material except that the amount of $BaTiO_3$ was adjusted to be 0.5 mol % with respect to the composite oxide.

Example 4

The same step was performed as in example 1 to obtain a positive electrode material except that the amount of $BaTiO_3$ was adjusted to be 1 mol % with respect to the composite oxide.

Example 5

The same step was performed as in example 1 to obtain a positive electrode material except that the amount of $BaTiO_3$ was adjusted to be 1.5 mol % with respect to the composite oxide.

Comparative Example 1

The same step was performed as in example 1 except that $BaTiO_3$ was not incorporated to produce a lithium transition metal composite oxide. Then, $BaTiO_3$ in a weighed amount adjusted to be 0.3 mol % with respect to the composite oxide was incorporated into, and mixed with, the lithium transition metal composite oxide. As a result, a positive electrode material was obtained. Hereinafter, the post-sintering incorporation of $BaTiO_3$ as in this example will be referred to as "secondary incorporation".

Comparative Example 2

The same step was performed as in example 1 except that $BaTiO_3$ was not incorporated to produce a lithium transition metal composite oxide. Then, $BaTiO_3$ in a weighed amount adjusted to be 0.3 mol % with respect to the composite oxide was incorporated into, and mixed with, the lithium transition metal composite oxide. The resultant substance was thermally treated at 500° C. for 10 hours in the air. As a result, a positive electrode material was obtained.

Comparative Example 3

The same step was performed as in comparative example 2 to obtain a positive electrode material except that the amount of $BaTiO_3$ was adjusted to be 1 mol % with respect to the composite oxide.

Comparative Example 4

The same step was performed as in comparative example 2 to obtain a positive electrode material except that after $BaTiO_3$ was incorporated, the resultant substance was thermally treated at 900° C.

Comparative Example 5

The same step was performed as in example 4 to obtain a positive electrode material except that $SrTiO_3$ was incorporated instead of $BaTiO_3$.

Comparative Example 6

The same step was performed as in example 2 to obtain a positive electrode material except that $TiO_3$ was incorporated instead of $BaTiO_3$.

Comparative Example 7

The same step was performed as in example 5 to obtain a positive electrode material except that $TiO_3$ was incorporated instead of $BaTiO_3$.

Comparative Example 8

The same step was performed as in comparative example 2 to obtain a positive electrode material except that $TiO_3$ in an amount of 0.5 mol % with respect to the composite oxide was incorporated instead of $BaTiO_3$.

Comparative Example 9

The same step was performed as in example 1 to obtain a positive electrode material except that $BaTiO_3$ was not incorporated.

(2) Production of the Nonaqueous Secondary Battery (Production of the Positive Electrode)

A positive electrode was produced by use of each of the positive electrode materials in examples 1 through 5 and comparative examples 1 through 9. 90 parts by mass of the obtained positive electrode material, 2.5 parts by mass of acetylene black, 2.5 parts by mass of graphite carbon, and 5.0 parts by mass of poly(vinylidene difluoride) (PVDF) as a binder were dispersed in N-methyl-2-pyrrolidone (NMP) to prepare a slurry. The resultant slurry was applied to one surface of an aluminum foil, was compression-molded by a press after being dried, and was cut to have a size of 15 $cm^2$. The positive electrode active material layer that was applied had a mass of about 0.32 g. The positive electrodes thus produced will respectively be referred to as the "positive electrodes of examples 1 through 5 and comparative examples 1 through 9".

(Production of the Negative Electrode)

97.5 parts by mass of natural graphite, 1.5 parts by mass of carboxymethylcellulose (CMC), and 1.0 parts by mass of styrene butadiene rubber (SBR) as a binder were dispersed in pure water to prepare a slurry. The resultant slurry was applied to a copper foil, was compression-molded by a press after being dried, and was cut to have a size of 16.64 $cm^2$. The negative electrode active material layer that was applied had a mass of about 0.18 g.

(Preparation of the Nonaqueous Electrolyte)

Ethylene carbonate (EC) and methyl ethyl carbonate (MEC) were mixed at a volume ratio of 3:7. Lithium hexafluoride ($LiPF_6$) was dissolved in the resultant mixed solvent so as to have a concentration of 1 mol/L. Thus, the nonaqueous electrolyte was prepared.

(Assembly of the Battery)

A nonaqueous secondary battery was produced by use of the positive electrode of each of examples 1 through 5 and comparative examples 1 through 9. A lead was attached to each of current collectors of the positive electrode and the negative electrode produced above, and vacuum drying was performed at 120° C. Then, the above-described separator was located between the positive electrode and the negative electrode. The set of the positive electrode, the negative electrode and the separator was put into a bag-like laminate pack. Then, the set was dried in vacuum at 60° C. to remove moisture adsorbed to the components. After the vacuum drying, the above-described nonaqueous electrolyte solution was injected into, and sealed in, the laminate pack. Thus, a laminate-type nonaqueous electrolytic solution secondary battery was obtained as a battery for evaluation. The resultant battery for evaluation was used to perform the following evaluations on the battery characteristics.

(3) Evaluation (Evaluation on the Gas Desorption)

The produced battery for evaluation was used to measure the gas desorption. First, the battery for evaluation (SUS-type single-electrode battery) was charged and discharged three times at 2.75 to 4.5 V by a charge/discharge tester (TOSCAT-3100, produced by Toyo System Co., Ltd.). Each of the lithium ion secondary batteries (SUS-type single-electrode batteries) after single-electrode measurement was charged at a constant current and a constant voltage of 4.5 V at a charging rate of 0.2 C at 25° C. for 15 hours by the above-described charge/discharge tester. Then, the lithium ion secondary battery (SUS-type single-electrode battery) was removed from the charge/discharge tester, and was disassembled in a glove box. The positive electrode was removed and a part thereof (5 mg) was cut out. The part cut out from each of the positive electrodes of examples 1 through 5 and comparative examples 1 through 9 was heated by a temperature programmed desorption optical ionization mass analyzer (TPD type R, produced by Rigaku Corporation), and the amount of generated oxygen was measured.

(Measurement of the c Axis Length)

The x-ray diffraction spectrum (tube current: 200 mA; tube voltage: 45 kV) of the positive electrode material in each of examples 1 through 5 and comparative examples 1 through 9 was measured by the CuKα beam. Based on the obtained x-ray diffraction spectrum, the c axis length was found by the Rietveld analysis by use of the Rietan 2000 software.

(4) Results and Considerations

Regarding the positive electrode materials in examples 1 through 5 and comparative examples 1 through 9, Table 1 shows the additive, timing of incorporation of the additive, thermal treatment temperature, amount of the additive, amount of generated oxygen, and c axis length. The amount of oxygen is represented with a ratio with respect to the amount of oxygen in the nonaqueous secondary battery in comparative example 9, in which $BaTiO_3$ was not incorporated. In each of all the nonaqueous secondary batteries in examples 1 through 5 and comparative examples 1 through 9, when the battery was heated from room temperature, oxygen started to be generated at about 230° C., and the amount of generated oxygen exhibited a large peak in the range of 230° C. to 450° C. and in the range of 510° C. to 600° C.

TABLE 1

| SAMPLE | ADDITIVE | TIMING OF INCORPORATION | THERMAL TREATMENT TEMPERATURE (° C.) | AMOUNT (MOL %) | AMOUNT OF GENERATED OXYGEN (%) | c AXIS LENGTH (Å) |
|---|---|---|---|---|---|---|
| EX 1 | $BaTiO_3$ | PRIMARY | — | 0.1 | 95 | 14.230 |
| EX 2 | | | | 0.3 | 85 | 14.233 |
| EX 3 | | | | 0.5 | 76 | 14.233 |
| EX 4 | | | | 1.0 | 65 | 14.239 |
| EX 5 | | | | 1.5 | 57 | 14.239 |
| COMPARATIVE EX 1 | $BaTiO_3$ | SECONDARY | | 0.3 | 106 | 14.227 |
| COMPARATIVE EX 2 | | | 500 | 0.3 | 110 | 14.232 |
| COMPARATIVE EX 3 | | | | 1.0 | 79 | 14.233 |
| COMPARATIVE EX 4 | | | 900 | 0.3 | 98 | 14.235 |
| COMPARATIVE EX 5 | $SrTiO_3$ | PRIMARY | | 1.0 | 80 | 14.235 |
| COMPARATIVE EX 6 | $TiO_2$ | | | 0.3 | 108 | 14.227 |
| COMPARATIVE EX 7 | | | | 1.5 | 83 | 14.233 |
| COMPARATIVE EX 8 | | SECONDARY | 500 | 0.5 | 99 | 14.228 |
| COMPARATIVE EX 9 | — | — | — | 0 | 100 | 14.227 |

As can be seen from Table 1, in each of the nonaqueous secondary batteries in examples 1 through 5, in which $BaTiO_3$ is incorporated before the sintering, the amount of generated oxygen is suppressed to 95% or lower, with respect to the amount of generated oxygen in the nonaqueous secondary battery in comparative example 9, in which $BaTiO_3$ is not incorporated. It is found that especially in the case where the amount of $BaTiO_3$ is 1 mol % or higher and 1.5 mol % or lower, the amount of generated oxygen is suppressed to 65% or lower.

As can be seen from a comparison between the results in example 4 and comparative example 5, a comparison between the results in example 2 and comparative example 6, and a comparison between the results in example 5 and comparative example 7, in the case where $SrTiO_3$ or $TiO_2$ is incorporated, instead of $BaTiO_3$, in the same amount as that of $BaTiO_3$, an effect of suppressing the generation of oxygen is provided but the provided effect is not as great as the effect in the case where $BaTiO_3$ is incorporated. A conceivable reason for this is as follows. In examples 4, 2 and 5, as compared with comparative examples 5, 6 and 7 respectively, the c axis length is longer. For this reason, use of $BaTiO_3$ allows a larger amount of titanium to be solid-dissolved in the lithium transition metal composite oxide than use of another titanium compound. Thus, a greater effect is provided in examples 4, 2 and 5.

It is found from the results in comparative example 1 that in the case where $BaTiO_3$ is incorporated after the lithium transition metal composite oxide is sintered, the generation of oxygen is not sufficiently suppressed. From a comparison between the results in example 2 and comparative examples 2 and 4, and a comparison between the results in example 4 and comparative example 3, it is found that in the case where heating is performed after $BaTiO_3$ is incorporated, the generation of oxygen is not suppressed. A conceivable reason for this is as follows. In the secondary sintering, no lithium compound as the material forming the lithium transition metal composite oxide is present. Therefore, titanium is solid-dissolved merely at the surface or in the vicinity thereof as a result of the thermal diffusion of Ti.

From the above-described results, it is considered that the $BaTiO_3$ added into a mixed raw material for the lithium transition metal composite oxide is decomposed thermally at a temperature at which a lithium compound of the mixed material is melted during sintering of the mixed raw material and that the titanium is incorporated in the particles of lithium transition metal composite oxide, whereby the titanium is diffused deeply into the inside of the particles of lithium transition metal composite oxide.

The method for producing the positive electrode material for the nonaqueous secondary battery according to the present disclosure is preferably usable as a method for producing a positive electrode material for a nonaqueous secondary battery for various applications. For example, the method for producing the positive electrode material for the nonaqueous secondary battery according to the present disclosure is suitable as a method for producing a positive electrode material for a nonaqueous secondary battery usable for mobile devices such as mobile phones, notebook computers, digital cameras and the like; and power sources such as batteries of electric vehicles.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method for producing a positive electrode material for a nonaqueous secondary battery, comprising:
preparing a complex oxide containing nickel and cobalt,
after the complex oxide containing nickel and cobalt is prepared, mixing $BaTiO_3$, the complex oxide containing nickel and cobalt, and a compound containing lithium to form a mixed material; and
sintering the mixed material to form a lithium transition metal composite oxide that has a layered structure,
wherein a ratio of $BaTiO_3$ with respect to the complex oxide containing nickel and cobalt is 1 mol % or higher and 2 mol % or lower.

2. The method for producing a positive electrode material for a nonaqueous secondary battery according to claim 1, wherein the preparing the complex oxide containing nickel and cobalt comprises preparing a precipitate comprising the complex oxide containing nickel and cobalt.

3. The method for producing a positive electrode material for a nonaqueous secondary battery of claim 1, wherein the lithium transition metal composite oxide is represented by composition formula (1):

$$Li_aNi_xCo_yM1_zTi_vM2_wO_2 \quad (1)$$

where $0.95 \leq a \leq 1.5$, $0 < x \leq 1$, $0 \leq y \leq 1$, $0 \leq z \leq 0.35$, $0.0001 \leq v \leq 0.02$, $0 \leq w \leq 0.05$, $x+y+z+v+w \leq 1$, M1 is at least one element selected from the group consisting of Al, Mn and Mg, and M2 is at least one element selected from the group consisting of Zr, W, Ta, Nb and Mo.

4. The method for producing a positive electrode material for a nonaqueous secondary battery of claim 1, wherein the step of forming the lithium transition metal composite oxide includes the step of sintering the mixed material at a temperature of 700° C. or higher and 900° C. or lower.

5. The method for producing a positive electrode material for a nonaqueous secondary battery of claim 4, wherein while the mixed material is being sintered, titanium is incorporated into particles of the lithium transition metal composite oxide at central portions thereof.

6. The method for producing a positive electrode material for a nonaqueous secondary battery of claim 4, wherein while the mixed material is being sintered, titanium is solid-dissolved in particles of the lithium transition metal composite oxide at central portions thereof.

7. The method for producing a positive electrode material for a nonaqueous secondary battery of claim 1, wherein $BaTiO_3$ has an average particle diameter of 0.1 μm to 5 μm.

8. The method for producing a positive electrode material for a nonaqueous secondary battery of claim 1, wherein while the mixed material is being sintered, titanium is incorporated into particles of the lithium transition metal composite oxide at central portions thereof.

9. The method for producing a positive electrode material for a nonaqueous secondary battery of claim 1, wherein while the mixed material is being sintered, titanium is solid-dissolved in particles of the lithium transition metal composite oxide at central portions thereof.

* * * * *